United States Patent
Okazaki et al.

(10) Patent No.: US 7,484,807 B2
(45) Date of Patent: Feb. 3, 2009

(54) SEAT RECLINING APPARATUS FOR VEHICLE

(75) Inventors: Hiroyuki Okazaki, Chiryu (JP); Masaki Sugimoto, Anjo (JP); Yukifumi Yamada, Toyota (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 11/870,154

(22) Filed: Oct. 10, 2007

(65) Prior Publication Data

US 2008/0088167 A1    Apr. 17, 2008

(30) Foreign Application Priority Data

Oct. 11, 2006   (JP) .............................. 2006-277521

(51) Int. Cl.
    *B60N 2/02* (2006.01)
(52) U.S. Cl. .............................. 297/378.13; 296/65.17
(58) Field of Classification Search ............ 297/378.13, 297/361.1; 296/65.17
    See application file for complete search history.

(56) References Cited

U.S. PATENT DOCUMENTS 4,561,694 A * 12/1985 Mouri et al. ............ 297/378.13

6,312,055 B1 * 11/2001 Uematsu ................ 297/378.13
2008/0129017 A1 * 6/2008 Okazaki et al. ........ 297/378.13

FOREIGN PATENT DOCUMENTS

JP    2003-54299    2/2003
JP    2003-312329   11/2003

* cited by examiner

*Primary Examiner*—Anthony D Barfield
(74) *Attorney, Agent, or Firm*—Oblon, Spivak, McClelland, Maier & Neustadt, P.C.

(57) ABSTRACT

A seat reclining apparatus for a vehicle, comprises a rail member attached to a vehicle body so as to be aligned approximately along a curve described by a pivotal movement of a seat back, a slider attached to the rail member so as to be slidable, a lock apparatus for regulating/permitting the slider to slide on the rail member, a striker including a first end portion, a second end portion and a connecting portion connecting the first end portion to the second end portion, the second end portion rotatably connected to the slider, the first end portion adapted to engage a lock member attached to the seat back and connected to the slider so as to be pivotable relative to the second end portion and the first end portion adapted to engage the lock member in order to maintain an angle of the seat back.

14 Claims, 4 Drawing Sheets

SEAT RECLINING APPARATUS FOR VEHICLE

CROSS REFERENCE TO RELATED APPLICATIONS

This application is based on and claims priority under 35 U.S.C. § 119 to Japanese Patent Application 2006-277521, filed on Oct. 11, 2006, the entire content of which is incorporated herein by reference.

FIELD OF THE INVENTION

The present invention relates to a seat reclining apparatus for a vehicle.

BACKGROUND

A seat reclining apparatus for a vehicle disclosed in JP2003312329A includes a rail member, a slider, a lock apparatus and a striker. The rail member is attached to a vehicle body and is formed in a circular arc shape to be aligned along a curve described by the seat back upon its reclining operation, the slider is engaged with the rail member so as to be slidable thereon, the lock apparatus regulates/permits the slider sliding on the rail member, and the striker is fixed on the slider. In this configuration, an angle of the seat back is maintained when the striker is engaged with a lock member attached to the seat back.

Further, a seat reclining apparatus for a vehicle disclosed in JP2003054299A basically has the same configuration as that of JP2003312329A. Specifically, in JP2003054299A, the rail member is formed in a straight shape and positioned so as to be approximately aligned along the curve described by the seat back upon its reclining operation. In this configuration, a gap existing between the lock member making pivotal movement and the striker moving straight, in other words, a gap existing in a radial direction of the rotation of the lock member, is adjusted.

In JP2003312329A, a positional error may occur between the rail member attached to a side surface of the vehicle body and the rotational center of the seat back set on the vehicle floor, and such error may affect on locking performance of the lock apparatus and slide resistance generated between the rail member and the slider. However, because the number of parts provided between the vehicle floor and the side surface of the vehicle is large, and most of the parts are mounted to the vehicle by welding, positions of the parts may not be accurate, as a result, the level of accuracy of the rotational center of the seat back may not be enhanced. Further, because a shape of the seat back may not be accurate, and the number of parts structuring the lock member is large, a strain may occur at the vehicle seat. Furthermore, manufacturing the rail member whose shape is an arc is difficult.

Accordingly, the slider may not slide on the rail member smoothly, and rattle may occur between the rail member and the slider. In JP2003312329A, any measure for those matters is not suggested. Furthermore, in JP2003054299A, because of the structure of the apparatus, a gap existing between the lock member making pivotal movement and the striker moving straight needs to be adjusted. In this case, even when the gap is adjusted, a small gap still needs to be provided between the lock member and the striker so that the striker may smoothly slide on the lock member. However, because of the small gap between the lock member and the striker, the seat back may be insecure in a direction of tilting movement thereof, as a result, the level of quality of the seat slide apparatus may be reduced. Further, when the gap is adjusted, resistance may be generated between the lock member and the striker, and a positional error may occur in the same manner as that in JP2003312329A.

A need thus exists for a seat reclining apparatus for vehicle which is not susceptible to the drawback mentioned above.

SUMMARY OF THE INVENTION

According to an aspect of the present invention, a seat reclining apparatus for a vehicle, comprises a rail member formed in a straight shape and attached to a vehicle body so as to be aligned approximately along a curve described by a pivotal movement of a seat back, a slider attached to the rail member so as to be slidable, a lock apparatus for regulating/permitting the slider to slide on the rail member, a striker including a first end portion, a second end portion and a connecting portion connecting the first end portion to the second end portion, the second end portion rotatably connected to the slider, the first end portion adapted to engage a lock member attached to the seat back and connected to the slider so as to be pivotable relative to the second end portion and the first end portion adapted to engage the lock member in order to maintain an angle of the seat back.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
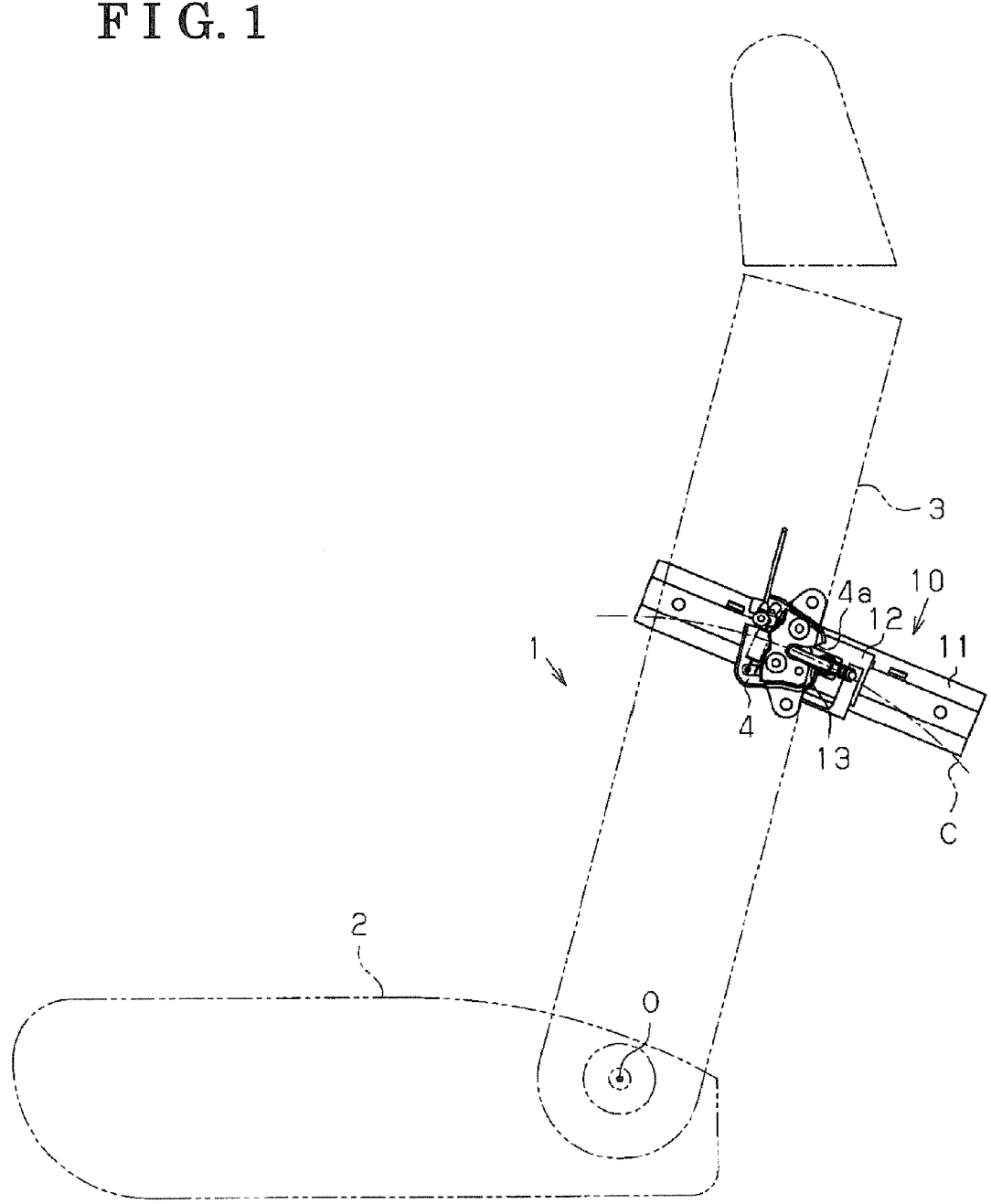
FIG. 1 illustrates a side view schematically indicating a vehicle seat.

An embodiment of the present invention will be explained in accordance with the attached drawings. FIG. 1 illustrates a side view schematically indicating a vehicle seat 1 to which the present invention applies. The vehicle seat 1 is mounted to a rear compartment of a vehicle such as an automobile. As illustrated in FIG. 1, the vehicle seat 1 includes a seat cushion 2 forming a seating surface of the vehicle seat 1 and a seat back frame 3 supported by the seat cushion 2 at a rear end portion thereof so as to be pivotable relative to a pivotal axis O. The seat back frame 3 forms a bone structure of the seat back.

Further, a lock member 4 is attached to the seat back frame 3. The lock member 4 is formed in an approximate U-shape, specifically, a recessed portion 4a is formed so that the lock member 4 is formed in the approximate U-shape having an upper portion and a lower portion. The lock member 4 is moved together with the seat back frame 3 with describing a curve C when the seat back frame 3 pivots relative to the pivotal axis O.

On the other hand, a rail member 11, which is formed in a straight shape, is attached to a vehicle body so as to be aligned along the tilting movement of the seat back. In other words, the rail member 11 is attached to a vehicle body at a central portion of the curve C described by the lock member 4 so as to extend in a tangential line direction of the curve C. A slider 12 is attached to the rail member 11 so as to be slidable thereon, and a striker 13 is connected to the slider 12 so as to face the recessed portion 4a of the lock member 4. The rail member 11, the slider 12 and the striker 13 configure a striker apparatus 10. While the slide of the slider 12 on the rail member 11 is limited, a first end of the striker 13 is inserted into the recessed portion 4a of the lock member 4, and the striker 13 is prevented from coming off from the recessed portion 4a by means of a latch mechanism (not shown) provided at the lock member 4, so that an angle of the seat back (seat back frame 3) can be maintained. The angle of the seat back frame 3 may be adjusted by changing the position of the slider 12 relative to the rail member 11.

Figure 2:
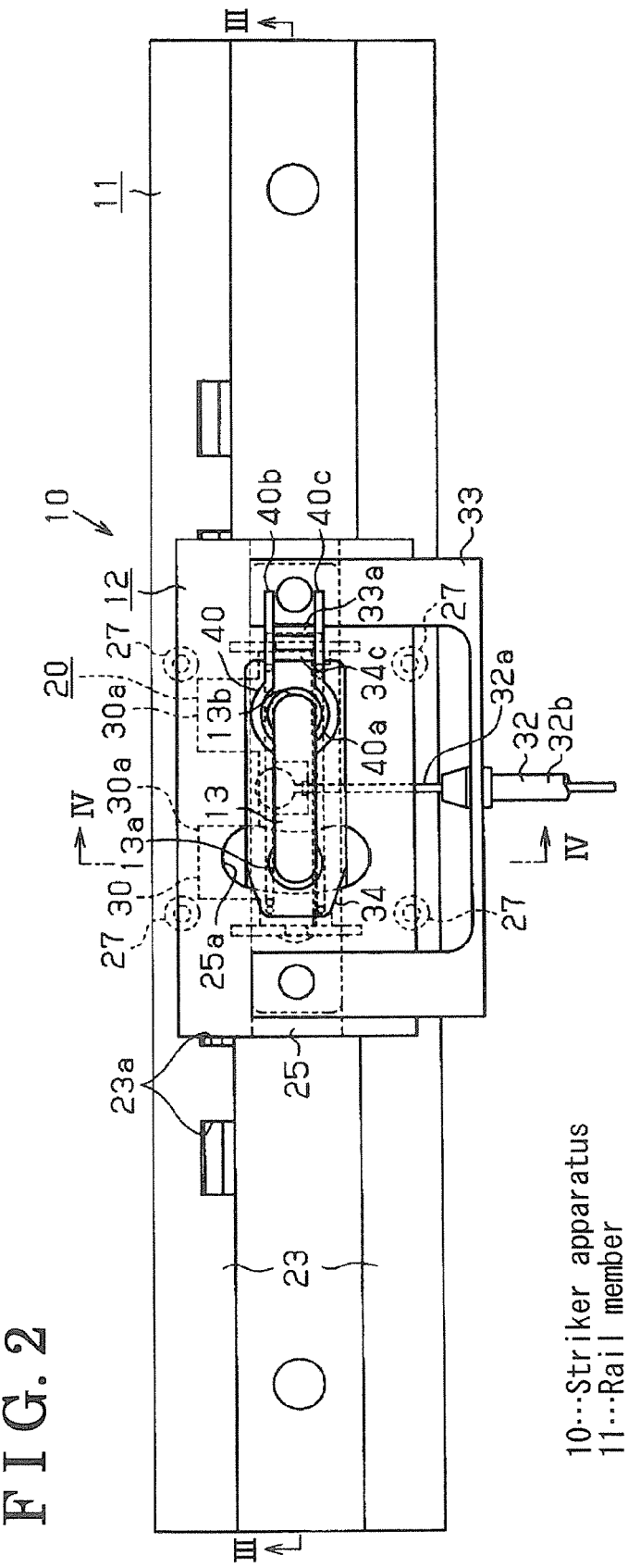
FIG. 2 illustrates a front view of a striker apparatus according to an embodiment of the present invention.
Figure 3:
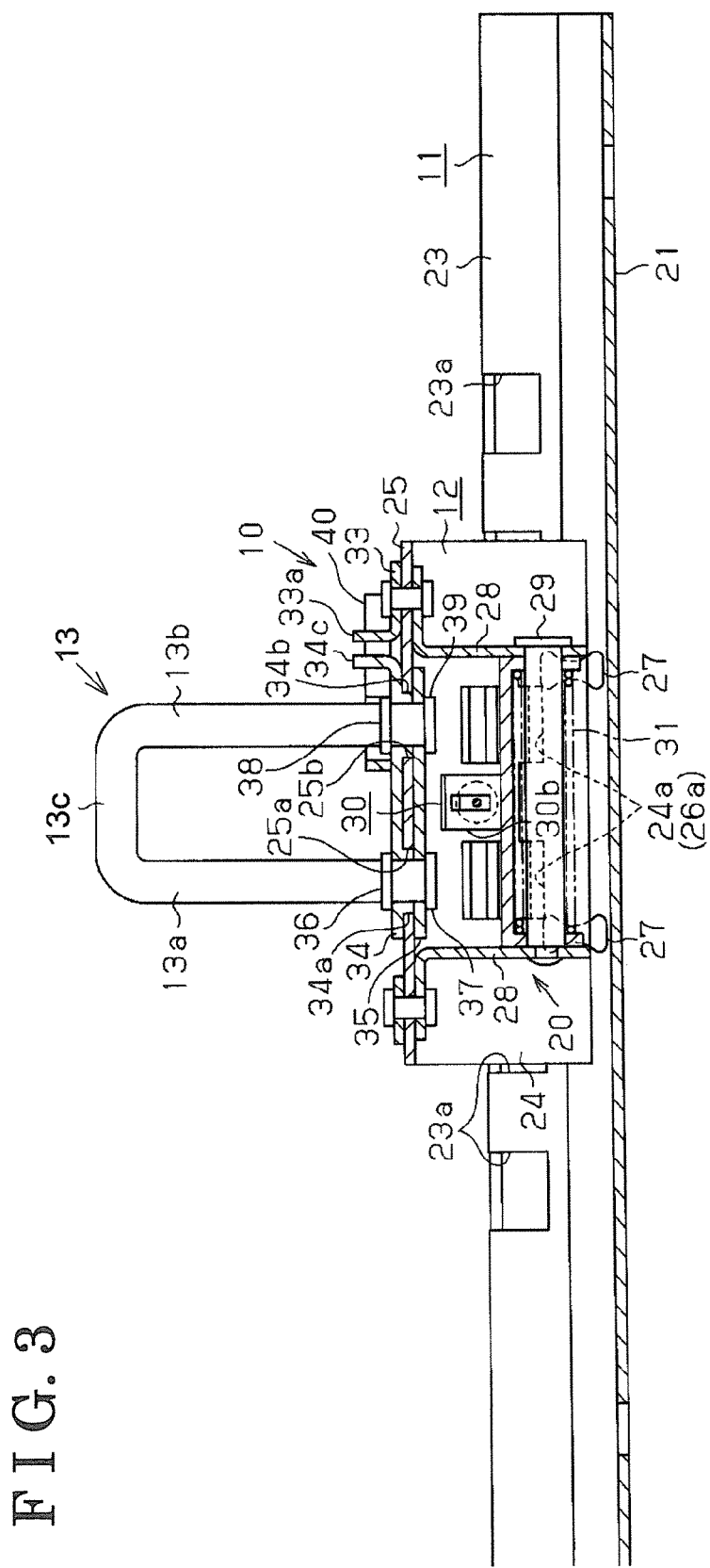
FIG. 3 illustrates a cross section of the striker apparatus illustrated in FIG. 2 taken along an III-III line in FIG. 2.
Figure 4:
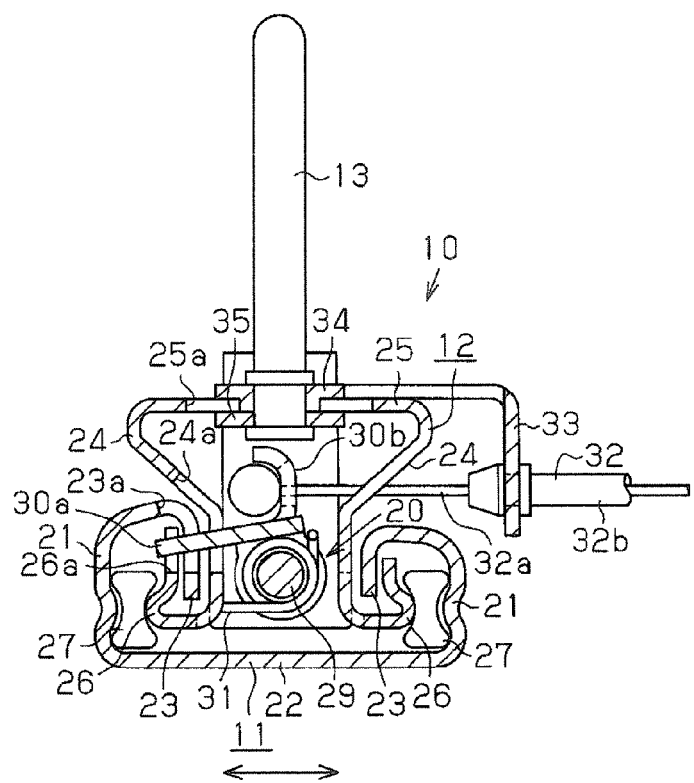
FIG. 4 illustrates a cross section of the striker apparatus illustrated in FIG. 2 taken along a IV-IV line in FIG. 2.

The striker apparatus 10 will be further explained in accordance to FIGS. 2 through 4. FIG. 2 illustrates a front view indicating the striker apparatus 10, FIG. 3 illustrates a cross section of the striker apparatus 10 along a II-III line, and FIG. 4 illustrates a cross section of the striker apparatus 10 along a IV-IV line.

As illustrated in FIG. 4, the rail member 11 is made of a plate material that basically includes two side wall portions 21 facing each other and a bottom portion 22 connecting the side wall portions 21 at lower ends thereof. Further, a fold portion 23 is continuously formed from each upper end of the side wall portions 21 so as to extend toward the lower end of each side wall portion 21. The rail member 11 formed in the straight line shape thus includes a U-shape constant cross section. The rail member 11 is fixed to the vehicle body at the bottom portion 22 thereof by means of fastening.

On the other hand, the slider 12 is made of a plate material and basically formed so as to include a pair of side wall portions 24 facing each other and a top portion 25 (e.g., wall portion) connecting the side wall portions 24 at each upper end thereof. When the slider 12 engages the rail member 11, the slider 12 is positioned in a manner where the pair of side wall portions 24 extend between the fold portions 23 of the rail member 11. The side wall portions 24 are bent inwardly at lower portions thereof so that a distance between the side wall portions 24 at each lower portion thereof is narrower than a distance between the side wall portions 24 at each upper portion thereof. Further a fold portion 26 is formed at each lower end of the side wall portion 24 in a manner where it is bent outwardly and extend upwardly so as to enclose each fold portion 23 of the rail member 11 when the slide 12 engages the rail member 11.

Because the slider 12 engages the rail member 11 in a manner where the fold portions 26 engage the fold portions 23, the slider 12 is prevented from moving in a vertical direction relative to the bottom portion 22 of the rail member 11. As shown in FIG. 4, four rollers 27 each formed in an hourglass-shape are provided between each of the fold portions 26 and the side wall portions 21. Specifically, each two of the rollers 27 are provided in a longitudinal direction of the slider 12 as illustrated in FIG. 3. Thus, the slider 12 is supported by the rail member 11 so as to be slidable in a longitudinal direction of the rail member 11 (in a direction of the tangential line of the curve C) in a manner where the rollers 27 are rotated therebetween.

On one of the fold portions 23 of the rail member 11, a plurality of lock holes 23a are formed so as to be arranged in a longitudinal direction of the rail member 11. Each of the lock holes 23a is formed in a square shape and is spaced equally from each other. In this embodiment, as illustrated in FIGS. 2, 3 and 4, six lock holes 23a are formed on the left fold portion 23 of the rail member 11.

Further, on one of the side wall portions 24 of the slider 12, a plurality of through holes 24a are formed so as to be arranged in a longitudinal direction of the slider 12. Each of the through holes 24a is equally spaced from each other so as to correspond with the lock holes 23a being adjacent to each other in a longitudinal direction of the rail member 11. In this embodiment, as illustrated in FIGS. 2, 3 and 4, two through holes 24a are formed on the left side wall portion 24 of the slider 12 and arranged so as to correspond with two of the lock holes 23 being adjacent to each other in a longitudinal direction of the rail member 11.

Further, on the one of the fold portions 26 of the slider 12, a plurality of notch portions 26a is formed so as to be arranged in a longitudinal direction of the slider 12. Each of the notch portions 26a is equally spaced from each other so as to correspond with the lock holes 23a being adjacent to each other. In this embodiment, as illustrated in FIGS. 3 and 4, two notch portions 26a are formed on the left hold portion 26 of the slider 12 so as to correspond with two lock holes 23a being adjacent to each other.

As illustrated in FIG. 3, two supporting brackets 28 are provided so as to be distanced in a longitudinal direction of the slider 12 and sandwich the two through holes 24a therebetween, and the two supporting brackets 28 are tightened to the top portion 25 of the slider 12. A lock lever 30 is supported by the supporting brackets 28 via a lock lever pin 29.

As illustrated in FIGS. 2 and 4, plural protruding portions 30a are formed on the lock lever 30. In this embodiment, two protruding portions 30a are formed on the lock lever 30 as illustrated in FIG. 2. Specifically, the protruding portions 30a are formed outwardly so as to face the through holes 24a and the notch portion 26a and so as to be distanced in a longitudinal direction.

Each protruding portion 30a of the lock lever 30 is positioned so as to be inserted into/removed from the through hole 24a and the notch portion 26a in accordance with the rotation of the lock lever 30 relative to the lock lever pin 29. In this configuration, when the lock lever 30 is rotated and each protruding portion 30a is inserted into the through hole 24a, the lock hole 23a and the notch portion 26a, the slider 12 is limited so as not to slide on the rail member 11, and further, the position of the striker 13, which is connected to the slider 12, is determined.

On the other hand, when the lock lever 30 is returned and each protruding portion 30a is removed from the notch portion 26a, the lock hole 23a and the through hole 24a sequentially, the slider 12 is allowed so as to slide on the rail member 11.

Further, a spring 31 is attached to the supporting brackets 28 by means of the lock lever pin 29. Specifically, one end of the spring 31 is engaged with one of the supporting brackets 28 and one end of the lock lever, and the other end of the spring 31 is engaged with the other of the supporting brackets 28 and the other end of the lock lever 30. In this configuration, the lock lever 30 is continuously biased in a manner where each protruding portion 30a is inserted into the through hole 24a.

Further, as illustrated in FIG. 3, an attachment piece 30b is formed between the protruding portions 30a so as to extend toward the top portion 25. As illustrated in FIGS. 2 and 4, one end of an internal wire 32a of a double pipe structured cable 32 is engaged with the attachment piece 30b, and an external wire 32b of the cable 32 is fixed to a cable bracket 33, which is tightened to the top portion 25 of the slider 12 together with the two supporting brackets 28. The other end of the internal wire 32a is connected to a release handle (not shown), and when the internal wire 32a is pulled outwardly by operating the release handle, the lock lever 30 is rotated against the biasing force applied thereto by the spring 31 so that each protruding portion 30a of the lock lever 30 is removed from the through hole 24a.

Thus, the lock holes 23a, the lock lever 30 and a surrounding structure thereof, all of which function in order to regulate/permit the slider 12 to slide on the rail member 11, comprise the lock apparatus 20. As illustrated in FIG. 3, the striker 13 is made of a round rod and formed in an approximate inverted U-shape having two corners so as to include a connecting portion 13c, a first end portion 13a and a second end portion 13b. Specifically, the connecting portion 13c connects an upper end of the first end portion 13a to an upper end of the second end portion 13b, and lower end portions of the first end portion 13a and the second end portion 13b are connected to the top portion 25 of the slider 12. Specifically, the striker 13 is connected to the top portion 25 in a manner where the second end portion 13b is rotatably connected to the top portion 25, and the first end portion 13a, which is adapted to be engaged with the lock member 4, is connected to the top portion 25 so as to pivot relative to the second portion 13b.

Further, as illustrated in FIGS. 2 and 3, an elongated hole 25a and a bearing hole 25b are formed on the top portion 25. Specifically, the first end portion 13a of the striker 13 is inserted into the elongated hole 25a, and the second end portion 13b of the striker 13 is inserted into the bearing hole. The elongated hole 25a is formed in a manner where it extends along a partial circumference of an imaginary circle formed relative to the bearing hole 25b as illustrated in FIG. 2. Furthermore, as illustrated in FIG. 3, a first bracket 34 and a second bracket 35 are provided so as to sandwich the top portion 25 therebetween within a distance between the elongated hole 25a and the bearing hole 25b in a manner where the first bracket 34 contacts the outer surface of the top portion 25, and the second bracket 35 contacts the inner surface of the top portion 25.

Further, the first end portion 13a of the striker 13 includes a first flange 36 and a second flange 37. Specifically, in this embodiment, the first flange 36 is engaged with the first bracket 34 at an outer surface thereof, and the edge of the first end portion 13a is penetrated through the first and the second brackets 34 and 35 and caulked by heat so as to be engaged with an inner surface of the second bracket 35 at the second flange 37. Furthermore, in this embodiment, a cylindrical portion 34a is integrally formed on the first bracket 34 in a manner where it extends so as to surround a part of the first end portion 13a of the striker 13 between the first bracket 34 and the second bracket 35 and engages with the second bracket 35.

In the same manner as the first end portion 13a, the second end portion 13b of the striker 13 includes a first flange 38 and a second flange 39. The first flange 38 is engaged with the first bracket 34 at the outer surface thereof, and the edge of the second end portion 13b is penetrated through the first and second brackets 34 and 35 and is caulked by heat so as to be engaged with the inner surface of the second bracket at the second flange 39. Further, a cylindrical portion 34b is integrally formed on the first bracket 34 in a manner where it extends so as to surround a part of the second end portion 13b between the first bracket 34 and the second bracket 35 and engages the second bracket 35.

Specifically, the first and second end portions 13a and 13b of the striker 13 are connected to the top portion 25 in a manner where the top portion 25 is sandwiched between the first and second flanges 36 and 37 and between the first and second flanges 38 and 39 together with the first and second brackets 34 and 35. In this configuration, the striker 13 can pivot in a manner where the first end portion 13a of the striker 13 moves relative to the second end portion 13b within an elongated hole 25a together with the first and second brackets 34 and 35.

Further, a torsional spring 40 functioning as a biasing means is provided at the slider 12 (the top portion 25). Specifically, the torsional spring 40 applies biasing force to the striker 13 so that the first end portion 13a is moved to its original positions where the first end portion 13a and the second end portion 13b are aligned with a longitudinal direction of the rail member 11 (see FIG. 2). Specifically, on the first bracket 34 fixed to the striker 13, a first engaging portion 34c is formed so as to bend outwardly (upwardly in FIG. 3) at a position being distant from the second end portion 13b toward the opposite side of the first end portion 13a in a radial direction of the second end portion 13b. Further, on the cable bracket 33 fixed to the slider 12, a second engaging portion 33a is formed so as to bend outwardly (upwardly in FIG. 3) at a position being distant from the second end portion 13b toward the opposite side of the first end portion 13a in a radial direction of the second engaging portion 13b when the first end portion 13a is located at its original position. Specifically, the first and second engaging portions 34c and 33a are aligned in a longitudinal direction of the rail member when the first end portion 13a is located at its original position.

Figure 5:
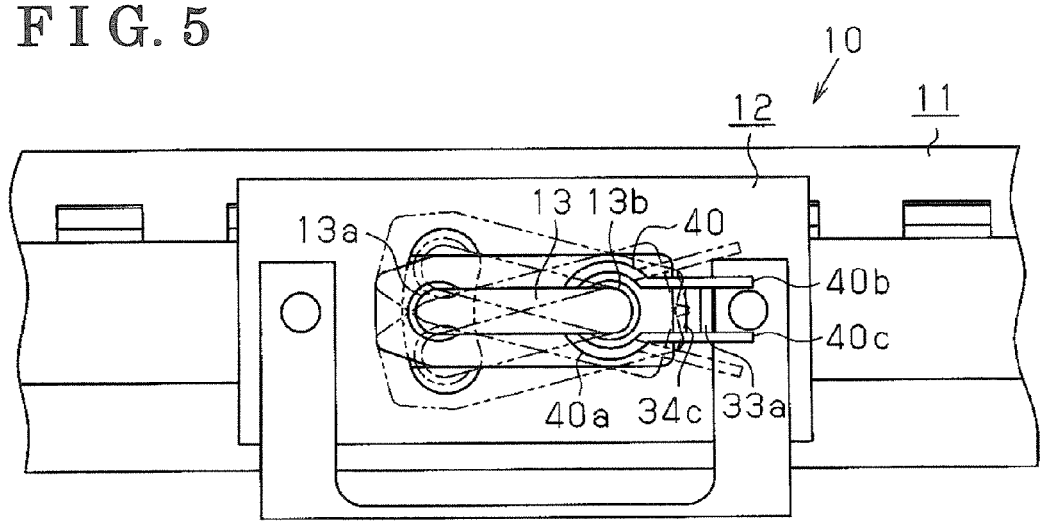
FIG. 5 illustrates a front view indicating an operation of the striker apparatus according to the embodiment of the present invention.

Further, as illustrated in FIG. 2, the torsional spring 40 includes a main part 40a, a first end part 40b and a second end part 40c. Specifically, the main part 40a is formed in an arch shape (major arc) and located around the second end portion 13b of the striker 13, the first end part 40b and the second end part 40c parallelly extend from the main part 40a and engaged with the first engaging portion 34c and the second engaging portion 33a. Thus, due to external force caused by the engagement between the striker 13 and the lock member 4, as illustrated in FIG. 5, once the first end portion 13a pivots from its original position in either direction relative to the second end portion 13b, the torsional spring 40 generates a biasing force by which the first end portion 13a returns to its original position. When the external force is released, the first end portion 13a is returned to its original position by the biasing force.

In this configuration, the position of the striker 13 is adjusted by adjusting the position of the slider 12, which is regulated/permitted to slide on the rail member 11 by means of the lock apparatus 20. The angle of the seat back frame 3 relative to the pivotal axis O is adjusted by adjusting the position of the striker 13 engaging with the lock member 4.

When the lock member 4 attached to the seat back frame 3 is engaged with the striker 13, a gap is generated between the lock member 4 and the striker 13, the lock member 4 adapted to pivot relative to the pivotal axis O in accordance with the tilt of the seat back frame 3 (seat back) and the striker 13 adapted to move along with the rail member 11. This gap (a gap in a radial direction of the rotation of the lock member 4) is adjusted by the pivotal movement of the first end portion 13a. Further, once the first end portion 13a is disengaged from the lock member 4, the first end portion 13a is moved to its original position by means of the biasing force applied by the torsional spring 40.

When the striker 13 is disengaged from the lock member 4, the seat back frame 3 can be pivoted relative to the pivotal axis O without interference with the striker apparatus 10 and other surrounding members.

According to the embodiment of the present invention, the rail member is formed in a simple structure such as a straight shape. In addition, the first end portion 13a of the striker 13 adapted to engage the lock member 4 is connected to the slider 12 so as to pivot in accordance with the tilting movement of the seat back (seat back frame 3). Thus, the gap existing between the lock member adapted to pivot in accordance with the tilt of the seat back (seat back frame 3) and the striker 13 (slider 12) adapted to move in a straight line is adjusted by the pivotal movement of the first end portion 13a adapted to engage the lock member 4.

Further, a positional error caused at the time of mounting the rail member 11 or the lock member 4 may be adjusted by the pivotal movement of the first end portion 13a of the striker 13.

According to the embodiment of the present invention, a part of the first end portion 13a is surrounded by the cylindrical portion 34a, and a part of the second end portion 13b is surrounded by the cylindrical portion 34b, within a distance between the first bracket 34 and the second bracket 35. Thus, when the first end portion 13a and the second end portion 13b are caulked by heat so as to form the second flanges 37 and 39, pressure caused by the caulking operation is received by the cylindrical portions 34a and 34b, so that the first end portion 13a and the second end portion 13b are prevented from being compressed between the first bracket 34 and the second bracket 35. Accordingly, excessive increase of the force for sandwiching the top portion 25 of the slider 12 by means of the first flanges 36 and 38 and the second flanges 37 and 39 together with the first and the second brackets 34 and 35 may be reduced. Further, the increase of operational resistance relative to the top portion 25 in accordance with the increase of the force for sandwiching the top portion 25 of the slider 12, the resistance caused by the pivotal movement of the first end portion 13a and by the rotation of the second end portion 13b, may be reduced.

According to the embodiment of the present invention, the first end portion 13a is moved to its original position by a biasing force applied by the torsional spring 40 so that the first end portion 13a being disengaged from the lock member 4 is prevented from being inserted into the recessed portion 4a of the lock member 4 in an unstable posture.

According to the embodiment of the present invention, the torsional spring 40 is formed in a simple structure including the main part 40a, the first end part 40b and the second end part 40c, and formed in a U-shape. Further, because the main part 40a is formed in an arch shape (major arch) having an opening, the torsional spring 40 may be easily mounted to the striker 13 so as to fit the outer periphery of the second end portion 13b.

The abovementioned embodiment may be modified as follows.

The shape of the torsional spring 40 may be modified. Further, a tension spring may be used as the biasing means.

Further, the second engaging portion 33a may be formed so as to be integral with the slider 12 (top portion 25). Furthermore, in the embodiment of the present invention, the cylindrical portions 34a and 34b are integrally formed at the first bracket 34, however, those cylindrical portions may be integrally formed at the second bracket 35 instead of the first bracket 34.

Further, the striker 13 is directly connected to the slider 12 (top portion 25) without using the first and second bracket 34 and 35.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat reclining apparatus for a vehicle, comprising:
a rail member formed in a straight shape and adapted to be attached to a vehicle body so as to be aligned approximately along a curve described by a pivotal movement of a seat back;
a slider attached to the rail member so as to be slidable along said rail member;
a lock apparatus for regulating/permitting the slider to slide on the rail member; and
a striker including a first end portion, a second end portion and a connecting portion connecting the first end portion to the second end portion, wherein the second end portion is rotatably connected to the slider such that said second end portion is rotatable relative to the slider, wherein the first end portion is adapted to engage a lock member attached to the seat back, and wherein the first end portion is pivotable relative to the second end portion such that said first end portion pivots about said second end portion as said second end portion rotates relative to said slider, and wherein the first end portion engages the lock member and pivoting of said first end portion relative to the second end portion accommodates a difference in paths of movement as the lock member travels along a curved path while said slider moves along a straight path during a reclining movement of a vehicle seat.

2. The seat reclining apparatus for the vehicle according to claim 1, wherein
the slider includes a wall portion in which an elongated hole, into which the first end portion is inserted, is formed, and in which a bearing hole, into which the second end portion is inserted, is formed, and wherein the wall portion is sandwiched by a first bracket and a second bracket,
each of the first end portion and the second end portion includes a first flange engaging the first bracket, each of the first end portion and the second end portion includes a second flange at which an edge of each of the first end portion and the second end portion penetrating through the first and second brackets is engaged with the second bracket by pressing, and
a cylindrical portion is integrally formed on one of the first bracket and the second bracket in a manner where the cylindrical portion extends so as to surround one of the first end portion and the second end portion between the first bracket and the second bracket and engages the other of the first bracket and the second bracket.

3. The seat reclining apparatus for the vehicle according to claim 1 further including:
a biasing means applying a biasing force to the first end portion, which is adapted to pivot relative to the second end portion, so as to be moved to its original position.

4. The seat reclining apparatus for the vehicle according to claim 2 further including:
a biasing means applying a biasing force to the first end portion, which is adapted to pivot relative to the second end portion, so as to be moved to its original position.

5. The seat reclining apparatus for the vehicle according to claim 3 further including:
a first engaging portion fixed to the striker and a second engaging portion fixed to the slider,
wherein the biasing means is a torsional spring including a main part, a first end part and a second end part, wherein the main part is formed in an arch shape and is located along a periphery of the second end portion of the striker, and wherein the first end part extends from one end of the main part and engages with the first engaging portion and the second engaging portion, and further wherein the second end part extends from the other end of the main part and engages with the first engaging portion and the second engaging portion.

6. The seat reclining apparatus for the vehicle according to claim 4 further including:
a first engaging portion fixed to the striker and a second engaging portion fixed to the slider,
wherein the biasing means is a torsional spring including a main part, a first end part and a second end part, wherein the main part is formed in an arch shape and is located along a periphery of the second end portion of the striker, and wherein the first end part extends from one end of the main part and engages with the first engaging portion and the second engaging portion, and further wherein the second end part extends from the other end of the main part and engages with the first engaging portion and the second engaging portion.

7. A seat reclining apparatus for a vehicle according to claim 1, wherein the first end portion pivots about an axis substantially perpendicular to a direction of movement of the slider along said rail member.

8. A seat reclining apparatus according to claim 7, wherein said axis extends through said second end portion.

9. A seat reclining apparatus for a vehicle, comprising:
a rail member defining a straight path and adapted to be attached to a vehicle body so as to be aligned approximately along a curve described by a pivotal movement of a seat back;
a slider attached to the rail member so as to be slidable along said straight path of the rail member;
a lock apparatus for regulating/permitting the slider to slide on the rail member; and
a striker including a first end portion, a second end portion and a connecting portion connecting the first end portion to the second end portion, wherein the second end portion is rotatably connected to the slider such that said second end portion is rotatable relative to the slider, wherein the first end portion is adapted to engage a lock member attached to the seat back, and wherein the first end portion is pivotable relative to the second end portion such that said first end portion pivots about said second end portion as said second end portion rotates relative to said slider, and wherein the first end portion engages the lock member and pivoting of said first end portion relative to the second end portion accommodates a difference in paths of movement as the lock member travels along a curved path while said slider moves along said straight path during a reclining movement of a vehicle seat, wherein the first end portion pivots about an axis substantially perpendicular to a direction of movement of the slider along said rail member.

10. The seat reclining apparatus for the vehicle according to claim 9, wherein
the slider includes a wall portion in which an elongated hole, into which the first end portion is inserted, is formed, and in which a bearing hole, into which the second end portion is inserted, is formed, and wherein the wall portion is sandwiched by a first bracket and a second bracket,
each of the first end portion and the second end portion includes a first flange engaging the first bracket, each of the first end portion and the second end portion includes a second flange at which an edge of each of the first end portion and the second end portion penetrating through the first and second brackets is engaged with the second bracket by pressing, and
a cylindrical portion is integrally formed on one of the first bracket and the second bracket in a manner where the cylindrical portion extends so as to surround one of the first end portion and the second end portion between the first bracket and the second bracket and engages the other of the first bracket and the second bracket.

11. The seat reclining apparatus for the vehicle according to claim 9 further including:
a biasing means applying a biasing force to the first end portion, which is adapted to pivot relative to the second end portion, so as to be moved to its original position.

12. The seat reclining apparatus for the vehicle according to claim 10 further including:
a biasing means applying biasing force to the first end portion, which is adapted to pivot relative to the second end portion, so as to be moved to its original position.

13. The seat reclining apparatus for the vehicle according to claim 11 further including:
a first engaging portion fixed to the striker and a second engaging portion fixed to the slider,
wherein the biasing means is a torsional spring including a main part, a first end part and a second end part, wherein the main part is formed in an arch shape and is located along a periphery of the second end portion of the striker, and wherein the first end part extends from one end of the main part and engages with the first engaging portion and the second engaging portion, and further wherein the second end part extends form the other end of the main part and engages with the first engaging portion and the second engaging portion.

14. The seat reclining apparatus for the vehicle according to claim 12 further including:
a first engaging portion fixed to the striker and a second engaging portion fixed to the slider,
wherein the biasing means is a torsional spring including a main part, a first end part and a second end part, wherein the main part is formed in an arch shape and is located along a periphery of the second end portion of the striker, and wherein the first end part extends from one end of the main part and engages with the first engaging portion and the second engaging portion, and further wherein the second end part extends from the other end of the main part and engages with the first engaging portion and the second engaging portion.

* * * * *